(12) United States Patent
Winfield

(10) Patent No.: US 9,532,676 B1
(45) Date of Patent: Jan. 3, 2017

(54) CHEESECAKE PAN SYSTEM

(71) Applicant: Barbara A. Winfield, Shreveport, LA (US)

(72) Inventor: Barbara A. Winfield, Shreveport, LA (US)

( * ) Notice: Subject to any disclaimer, the term of this patent is extended or adjusted under 35 U.S.C. 154(b) by 592 days.

(21) Appl. No.: 14/027,523

(22) Filed: Sep. 16, 2013

Related U.S. Application Data

(63) Continuation-in-part of application No. 13/223,823, filed on Sep. 1, 2011, now Pat. No. 8,534,188.

(51) Int. Cl.
*A47J 27/04* (2006.01)
*A47J 37/01* (2006.01)

(52) U.S. Cl.
CPC ............... *A47J 27/04* (2013.01); *A47J 37/01* (2013.01)

(58) Field of Classification Search
CPC combination set(s) only.
See application file for complete search history.

(56) References Cited

U.S. PATENT DOCUMENTS

| | | | |
|---|---|---|---|
| 3,641,926 A | 2/1972 | Williams et al. | |
| 4,099,512 A | 7/1978 | Noonan | |
| 4,528,975 A | 7/1985 | Wang | |
| 4,574,776 A | 3/1986 | Hidle | |
| 4,922,079 A | 5/1990 | Bowen et al. | |
| 5,235,904 A | 8/1993 | Ludena | |
| 5,287,798 A | 2/1994 | Takeda | |
| 5,584,232 A | 12/1996 | Bush | |
| 5,730,045 A | 3/1998 | Delaquis et al. | |
| D396,600 S | 8/1998 | Otero | |
| 7,478,588 B2 | 1/2009 | Miller et al. | |
| 2004/0216620 A1 | 11/2004 | Quiggins et al. | |
| 2007/0257166 A1 | 11/2007 | Christopherson | |
| 2010/0051626 A1 | 3/2010 | Moom et al. | |
| 2010/0260909 A1 | 10/2010 | McPheron et al. | |

OTHER PUBLICATIONS

"Pyrex Products, Making Cooking a Little Easier"; Website; Oct. 17, 2009; http://wayback.archive.org/web/20091017233608/http://www.pyrexware.com/index.asp?pageId=11&CatID=388&SubCatID=394&upc:70950042986[Jan. 17, 2013 1:42:05 PM].

*Primary Examiner* — Dana Ross
*Assistant Examiner* — Renee Larose

(57) ABSTRACT

A cheesecake pan system features a separate cheesecake pan bottom plate and a cylindrical cheesecake pan side wall having a spring-biased gap. A pan groove is located around a cheesecake pan side wall inner periphery and a cheesecake pan ridge is located around a bottom plate side wall outer periphery. The cheesecake pan bottom plate is adapted to snuggly fit in the cheesecake pan side wall. The system features a water base pan with a vapor hole centrally located in a raised bottom plate floor section. A water base pan ledge is located around a side wall inner periphery. The system features an elastomeric annular sealing ring designed to fit over a cheesecake pan lip. The cheesecake pan is placed on the water base pan.

8 Claims, 6 Drawing Sheets

CHEESECAKE PAN SYSTEM

CROSS REFERENCE

This application claims priority to U.S. patent application Ser. No. 13/223,823 filed Sep. 1, 2011, the specification of which is incorporated herein in its entirety by reference.

FIELD OF THE INVENTION

The present invention relates to bakeware, or more specifically, bakeware for preparing cheesecakes.

BACKGROUND OF THE INVENTION

Often, when baking a cheesecake, water is placed in a pan underneath a separate cheesecake pan to promote even baking of the cheesecake. The present invention features a cheesecake pan system for aiding even cooking of a cheesecake when placed into an oven.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a cheesecake pan system for aiding even cooking of a cheesecake when placed into an oven. In some embodiments, the system comprises a cheesecake pan having a separate cheesecake pan bottom plate and a separate cylindrical cheesecake pan side wall. In some embodiments, the cheesecake pan bottom plate is round. In some embodiments, the cheesecake pan side wall comprises a gap located from a cheesecake pan side wall top to a cheesecake pan side wall bottom. In some embodiments, the cheesecake pan side wall is spring-biased. In some embodiments, a pan groove is located around a cheesecake pan side wall inner periphery. In some embodiments, a cheesecake pan lip is located around a cheesecake pan bottom plate side wall outer periphery. In some embodiments, the cheesecake pan bottom plate is adapted to snuggly fit in the cheesecake pan side wall via the cheesecake pan ridge located around the cheesecake pan bottom plate side wall outer periphery forming the cheesecake pan when the cheesecake pan side wall is in a second closed position.

In some embodiments, the system comprises a water base pan having bottom plate and a pan side wall. In some embodiments, the bottom plate is round and comprises a vapor hole centrally located in a raised bottom plate floor section therein. In some embodiments, an annular trough is located on the bottom plate and is defined by the side wall and the raised bottom plate floor section. In some embodiments, a water base pan ledge is located around a side wall inside periphery next to a side wall top.

In some embodiments, the system comprises an elastomeric annular sealing ring. In some embodiments, a ring groove is located around a ring inside periphery thereon. In some embodiments, a ring groove diameter is generally equal to a cheesecake pan lip outside diameter. In some embodiments, the sealing ring is designed to fit over the cheesecake pan lip before placing the cheesecake pan on the water base pan.

BRIEF DESCRIPTION OF THE DRAWINGS

This patent application contains at least one drawing executed in color. Copies of this patent or patent application publication with color drawing(s) will be provided by the Office upon request and payment of the necessary fee.

DESCRIPTION OF PREFERRED EMBODIMENTS

Figure 1:
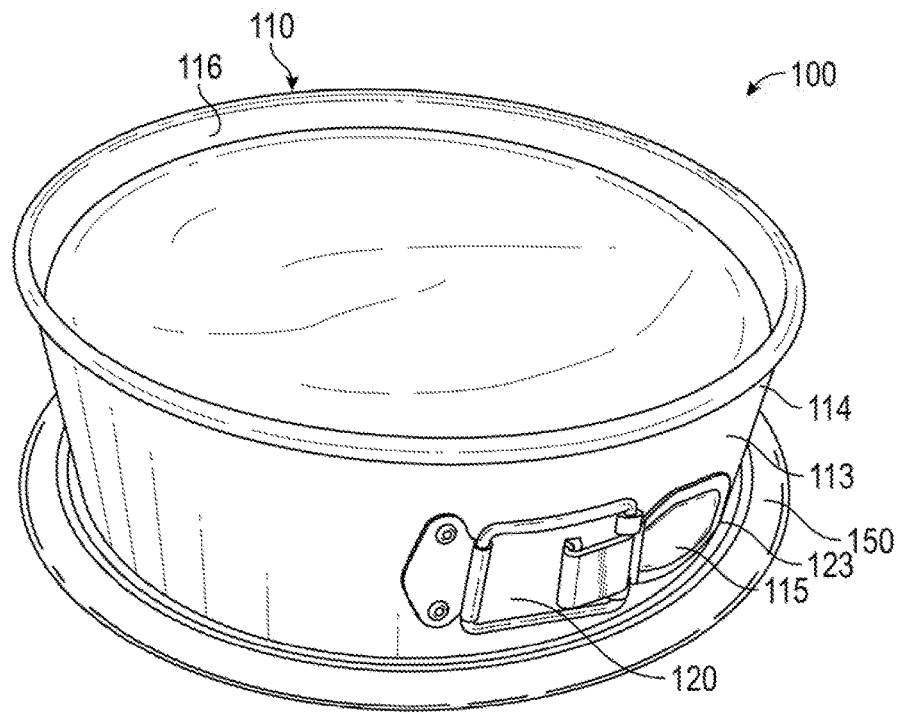
FIG. 1 shows a perspective view of the present invention.
Figure 2:
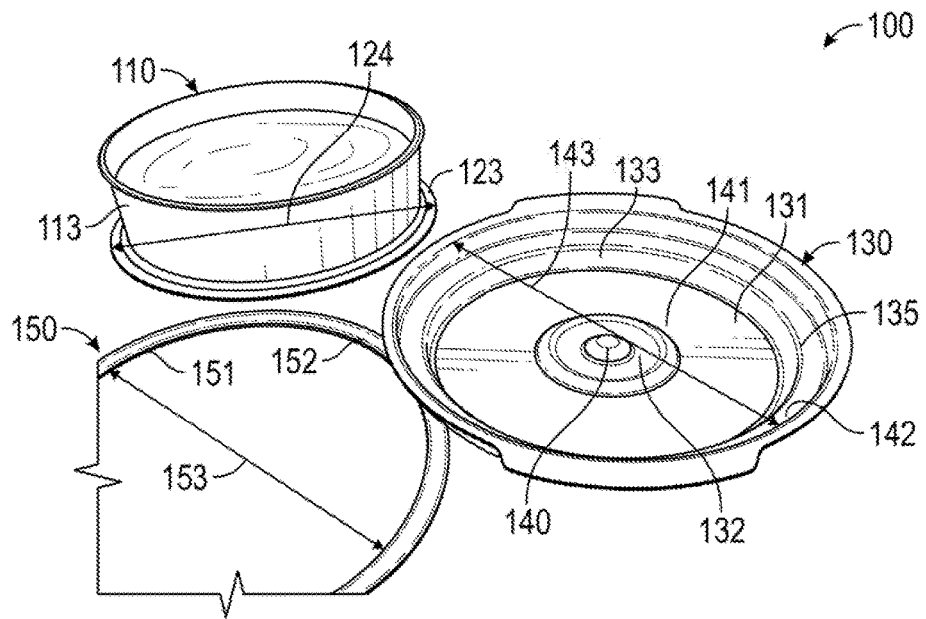
FIG. 2 shows a perspective view of the cheesecake pan, the water base pan, and the sealing ring of the present invention.
Figure 3:
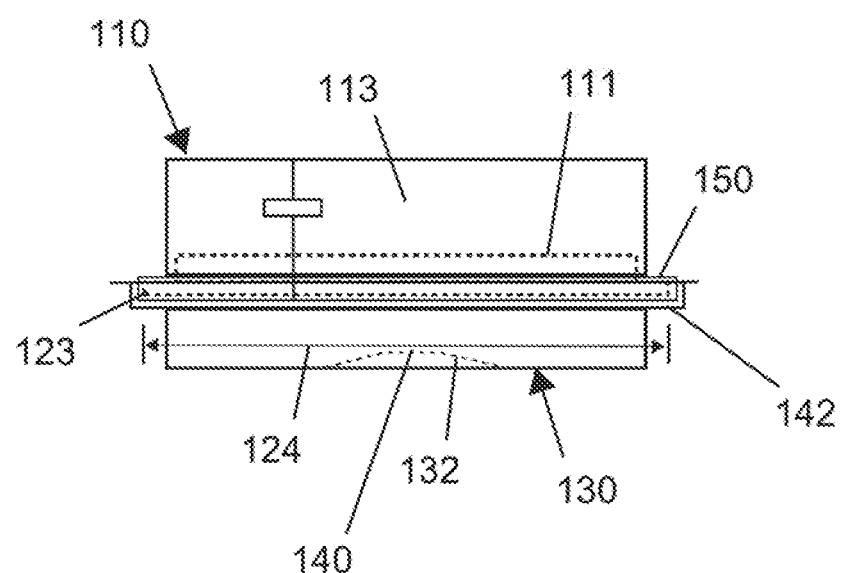
FIG. 3 shows a side view of the cheesecake pan, the water base pan, and the sealing ring of the present invention.
Figure 4:
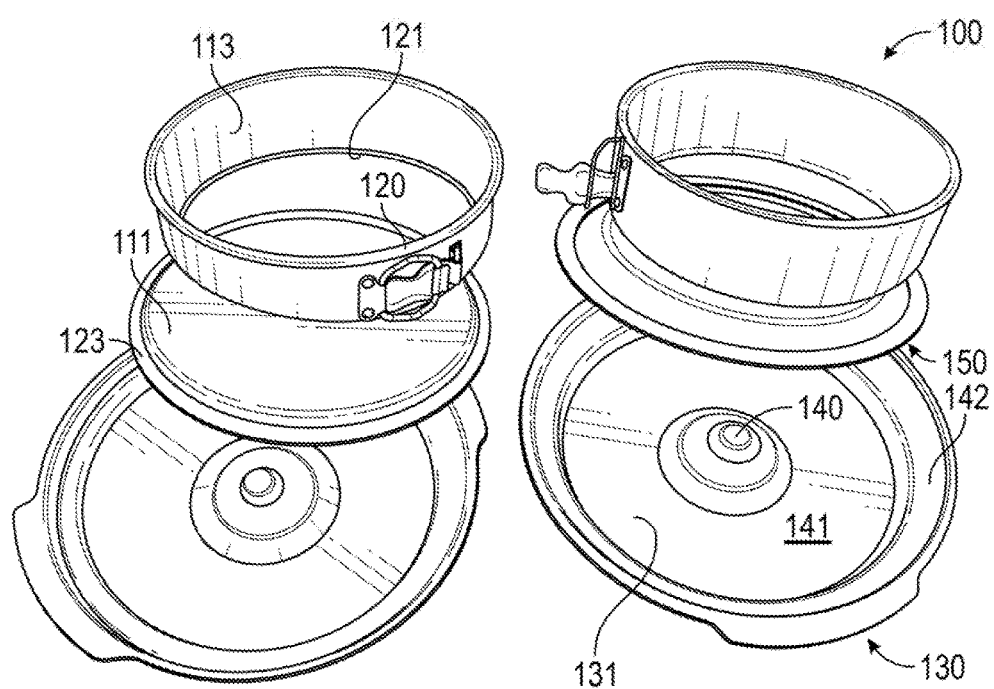
FIG. 4 shows a perspective view of the present invention.
Figure 5:
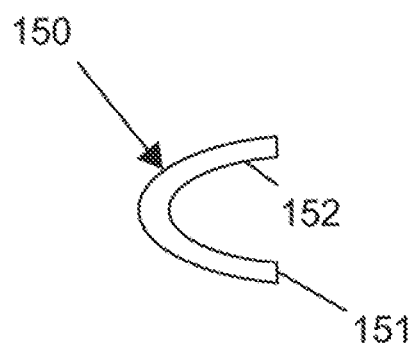
FIG. 5 shows a cross-sectional view of the sealing ring of the present invention.
Figure 6:
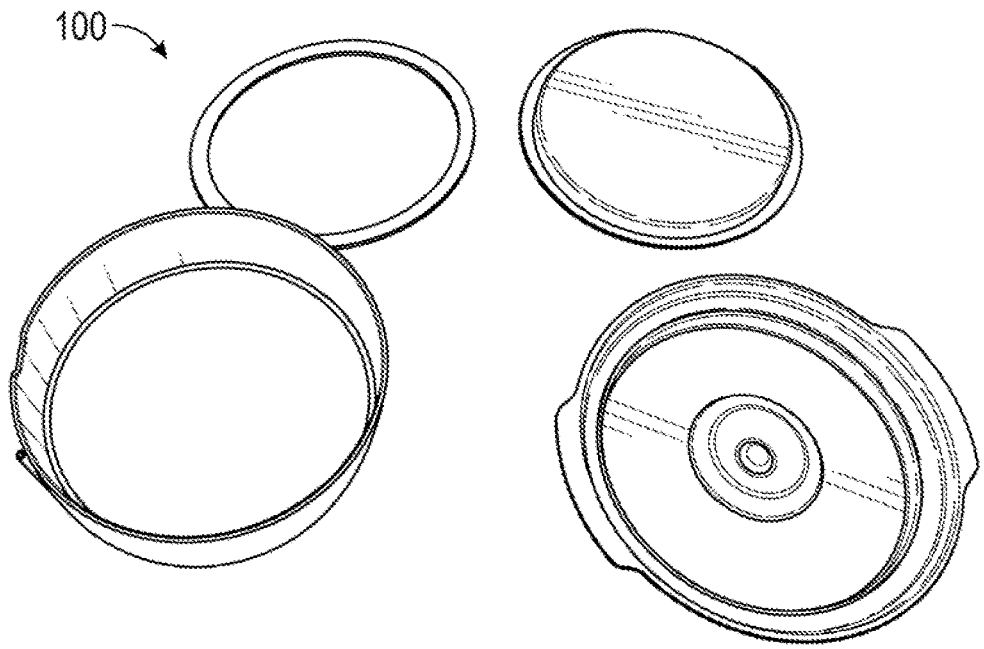
FIG. 6 shows a perspective view of the present invention.
Figure 7:
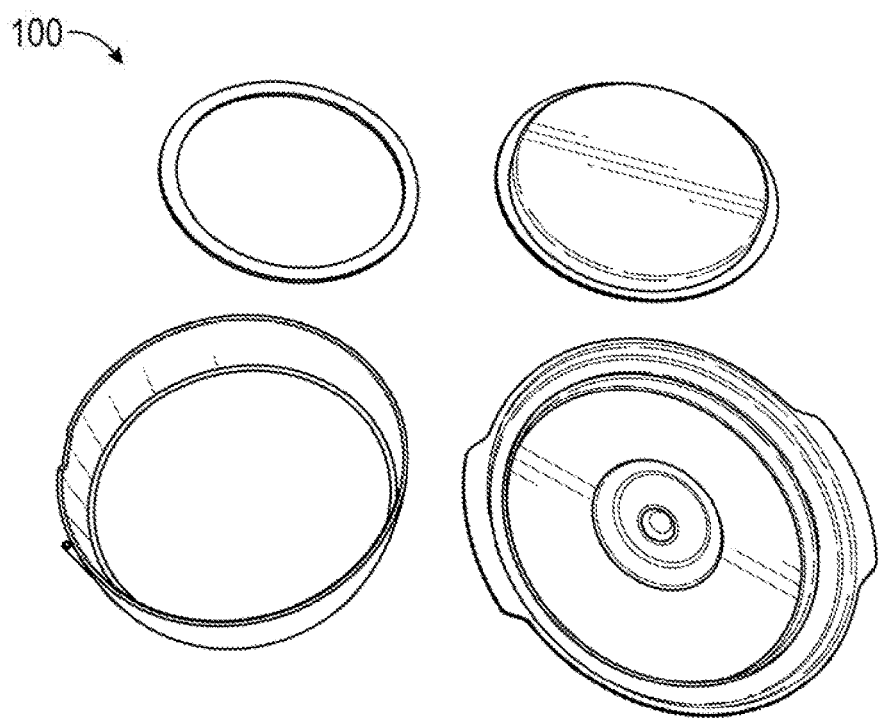
FIG. 7 shows a perspective view of the present invention.
Figure 8:
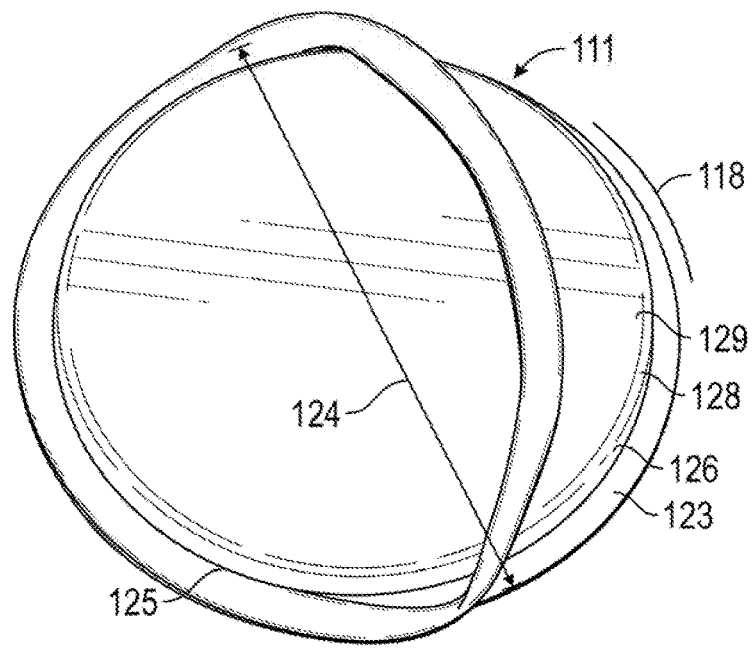
FIG. 8 shows a perspective view of the cheesecake pan bottom plate of the present invention.
Figure 9:
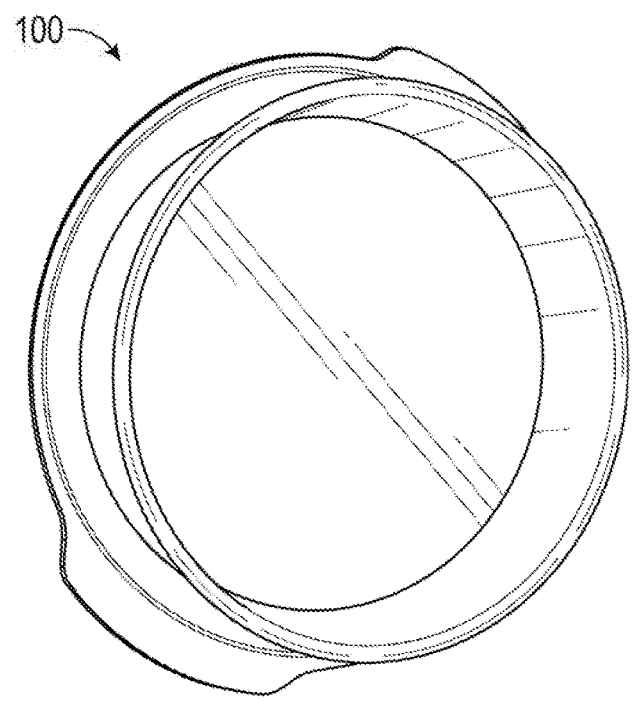
FIG. 9 shows a front view of the present invention in assembled form.

Following is a list of elements corresponding to a particular element referred to herein:
100 Cheesecake pan system
110 Cheesecake pan
111 Cheesecake pan bottom plate
113 Cheesecake pan side wall
114 Cheesecake pan side wall top
115 Cheesecake pan side wall bottom
116 Cheesecake pan side wall inner periphery
118 Cheesecake pan bottom plate outer periphery
120 Gap
121 Pan groove
123 Cheesecake pan lip
124 Cheesecake pan lip outside diameter
125 Cheesecake pan ridge
126 Cheesecake pan bottom plate side wall
128 Cheesecake pan bottom plate side wall outer periphery
129 Cheesecake pan bottom plate side wall lower edge
130 Water base pan
131 Water base pan bottom plate
132 Water base pan bottom plate floor section
133 Water base pan side wall
135 Water base pan side wall top
140 Vapor hole
141 Trough
142 Water base pan ledge
143 Water base pan ledge inside diameter
150 Sealing ring
151 Sealing ring inside periphery
152 Ring groove
153 Ring groove diameter Referring now to FIG. 1-9, the present invention features a cheesecake pan system (100) for aiding even cooking of a cheesecake when placed into an oven. In some embodiments, the system (100) comprises a cheesecake pan (110) having a separate cheesecake pan bottom plate (111) and a separate cylindrical cheesecake pan side wall (113).

In some embodiments, the round cheesecake pan bottom plate (111) comprises a planar surface having a cheesecake pan bottom plate side wall (126) perpendicularly located on a cheesecake pan bottom plate outer periphery (118) thereon.

In some embodiments, the cheesecake pan bottom plate side wall (126) comprises a cheesecake pan ridge (125) located around a cheesecake pan bottom plate side wall outer periphery (128) thereon. In some embodiments, the cheesecake pan bottom plate side wall (126) comprises a cheesecake pan lip (123) perpendicularly located on the cheesecake pan bottom plate side wall outer periphery (128) thereon adjacent to a cheesecake pan bottom plate side wall lower edge (129). In some embodiments, the cheesecake pan lip (123) projects out and away from the cheesecake bottom plate side wall (126). In some embodiments, the cheesecake pan lip (123) comprises a cheesecake pan lip outside diameter (124).

In some embodiments, the cheesecake pan side wall (113) comprises a gap (120) located from a cheesecake pan side wall top (114) to a cheesecake pan side wall bottom (115). In some embodiments, the cheesecake pan side wall (113) is spring-biased. In some embodiments, in an open, first position, the gap (120) is spread apart and the cheesecake pan side wall (113) comprises a cheesecake pan first diameter. In some embodiments, in a closed, second position, the gap (120) is closed and the cheesecake pan side wall (113) comprises a cheesecake pan second diameter smaller than the cheesecake pan first diameter.

In some embodiments, a pan groove (121) is located around a cheesecake pan side wall inner periphery (116) proximal to the cheesecake pan side wall bottom (115).

In some embodiments, the cheesecake pan bottom plate (111) is adapted to snuggly fit in the pan groove (121) via the cheesecake pan ridge (125) located on the cheesecake pan bottom plate side wall (126) forming the cheesecake pan (110) when the cheesecake pan side wall (113) is in the second position.

In some embodiments, the system (100) comprises a water base pan (130) having a contiguous water base pan bottom plate (131) and a water base pan side wall (133). In some embodiments, the water base pan bottom plate (131) is round. In some embodiments, the water base pan bottom plate (131) comprises a vapor hole (140) centrally located in a raised water base pan bottom plate floor section (132) therein. In some embodiments, an annular trough (141) is located on the water base pan bottom plate (131) and defined by the water base pan side wall (133) and the raised water base pan bottom plate floor section (132). In some embodiments, a water base pan ledge (142) is located around a water base pan side wall (133) inner periphery adjacent to a water base pan side wall top (135). In some embodiments, the water base pan ledge (142) comprises a water base pan ledge inside diameter (143). In some embodiments, the water base pan ledge inside diameter (143) is slightly greater than the cheesecake pan lip outside diameter (124) and is designed to receive the cheesecake pan lip (123).

In some embodiments, the system (100) comprises an annular sealing ring (150). In some embodiments, a ring groove (152) is located around a sealing ring inside periphery (151) thereon. In some embodiments, a ring groove diameter (153) is generally equal to the cheesecake pan lip outside diameter (124). In some embodiments, the sealing ring (150) is designed to stretchably and sealably fit over the cheesecake pan lip (123). In some embodiments, the cheesecake pan (110) is sealably located on the water base pan ledge (142) via the sealing ring (150) over the cheesecake pan lip (123). In some embodiments, the water base pan ledge inside diameter (143) is slightly greater than the cheesecake pan lip outside diameter (124) with the sealing ring placed thereon and is designed to receive the cheesecake pan lip (123).

In some embodiments, cheesecake ingredients are located in the cheesecake pan (110). In some embodiments, water is placed in the annular trough (141) of the water base pan (130). In some embodiments, the sealing ring (150) is located over the cheesecake pan lip (123). In some embodiments, the cheesecake pan lip (123) is located on the water base pan ledge (142).

In some embodiments, the water is heated and vaporously contacts a cheesecake pan bottom plate (111) bottom surface and exits a chamber formed by the water base pan (130) and the cheesecake pan (110) via the vapor hole (140).

In some embodiments, the cheesecake pan (110) comprises no handles. In some embodiments, the water base pan (130) comprises no handles.

In some embodiments, the cheesecake pan side wall (113) is held into the second position via a latch located on an exterior surface of the cheesecake pan side wall (113) thereon.

In some embodiments, the vapor hole (140) comprises a diameter of 1 millimeter. In some embodiments, the vapor hole (140) comprises a diameter of 2 millimeters. In some embodiments, the vapor hole (140) comprises a diameter of 3 millimeters. In some embodiments, the vapor hole (140) comprises a diameter of 4 millimeters or more.

In some embodiments, the raised water base pan bottom plate floor section (132) is conical, resembling an anthill. In some embodiments, the raised water base pan bottom plate floor section (132) is cylindrical with a flat portion on top, resembling a raised plateau. In some embodiments, the vapor hole (140) is located on the flat portion. In some embodiments, the raised water base pan bottom plate floor section (132) is cylindrical with a flat portion on top having a hemispherical indention. In all cases, the vapor hole (140) is centrally located with respect to the water base pan bottom floor section (132).

In some embodiments, the water base pan ledge (142) comprises integrated handles located thereon.

In some embodiments, the sealing ring (150) is constructed from silicone. In some embodiments, the sealing ring (150) is constructed from rubber. In some embodiments, the sealing ring (150) is elastomeric. In some embodiments, the sealing ring (150) is stretchable.

As used herein, the term "about" refers to plus or minus 10% of the referenced number.

The disclosures of the following U.S. Patents are incorporated in their entirety by reference herein: U.S. Pat. No. 3,641,926; U.S. Pat. No. 4,099,512; U.S. Pat. No. 4,528,975; U.S. Pat. No. 4,574,776; U.S. Pat. No. 4,922,079; U.S. Pat. No. 5,235,904; U.S. Pat. No. 5,287,798; U.S. Pat. No. 5,584,232; U.S. Pat. No. 5,730,045; U.S. Pat. No. 7,478,588; U.S. Design Pat. No. D 396,600; U.S. Patent Application No. 2004/0216620; U.S. Patent Application No. 2007/0257166; and U.S. Patent Application No. 2010/0051626.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A cheesecake pan system (100) for aiding even cooking of a cheesecake when placed into an oven, wherein the system (100) comprises:

(a) a cheesecake pan (110) having a separate cheesecake pan bottom plate (111) and a separate cylindrical cheesecake pan side wall (113), wherein the round cheesecake pan bottom plate (111) comprises a planar surface having a cheesecake pan bottom plate side wall (126) perpendicularly disposed on a cheesecake pan bottom plate outer periphery (118) thereon, wherein the cheesecake pan bottom plate side wall (126) comprises a cheesecake pan ridge (125) disposed around a cheesecake pan bottom plate side wall outer periphery (128) thereon, wherein the cheesecake pan bottom plate side wall (126) comprises a cheesecake pan lip (123) perpendicularly disposed on the cheesecake pan bottom plate side wall outer periphery (128) thereon adjacent to a cheesecake pan bottom plate side wall lower edge (129), wherein the cheesecake pan lip (123) projects out and away from the cheesecake bottom plate side wall (126), wherein the cheesecake pan lip (123) comprises a cheesecake pan lip outside diameter (124), wherein the cheesecake pan side wall (113) comprises a gap (120) disposed from a cheesecake pan side wall top (114) to a cheesecake pan side wall bottom (115), wherein the cheesecake pan side wall (113) is spring-biased, wherein in an open, first position, the gap (120) is spread apart and the cheesecake pan side wall (113) comprises a cheesecake pan first diameter, wherein in a closed, second position, the gap (120) is closed and the cheesecake pan side wall (113) comprises a cheesecake pan second diameter smaller than the cheesecake pan first diameter, wherein a pan groove (121) is disposed around a cheesecake pan side wall inner periphery (116) proximal to the cheesecake pan side wall bottom (115);

wherein the cheesecake pan bottom plate (111) is adapted to snuggly fit in the pan groove (121) via the cheesecake pan ridge (125) on the cheesecake pan bottom plate side wall (126) forming the cheesecake pan (110) when the cheesecake pan side wall (113) is in the second position;

(b) a water base pan (130) having a contiguous water base pan bottom plate (131) and a water base pan side wall (133), wherein the water base pan bottom plate (131) is round, wherein the water base pan bottom plate (131) comprises a vapor hole (140) centrally disposed in a raised water base pan bottom plate floor section (132) therein, wherein an annular trough (141) is disposed on the water base pan bottom plate (131) and defined by the water base pan side wall (133) and the raised water base pan bottom plate floor section (132), wherein a water base pan ledge (142) is disposed around a water base pan side wall (133) adjacent to a water base pan side wall top (135), wherein the water base pan ledge (142) comprises a water base pan ledge inside diameter (143), wherein the water base pan ledge inside diameter (143) is slightly greater than the cheesecake pan lip outside diameter (124) and is designed to receive the cheesecake pan lip (123); and (c) an annular sealing ring (150), wherein a ring groove (152) is disposed around a sealing ring inside periphery (151) thereon, wherein a ring groove diameter (153) is generally equal to the cheesecake pan lip outside diameter (124), wherein the sealing ring (150) is designed to stretchably and sealably fit over the cheesecake pan lip (123), wherein the cheesecake pan (110) is sealably disposed on the water base pan ledge (142) via the sealing ring (150) over the cheesecake pan lip (123).

2. The system (100) of claim 1, wherein the cheesecake pan (110) comprises no handles.

3. The system (100) of claim 1, wherein the water base pan (130) comprises no handles.

4. The system (100) of claim 1, wherein the cheesecake pan side wall (113) is held into the second position via a latch disposed on an exterior surface of the cheesecake pan side wall (113) thereon.

5. The system (100) of claim 1, wherein the vapour hole (140) comprises a diameter of 1 millimeter.

6. The system (100) of claim 1, wherein the vapour hole (140) comprises a diameter of 2 millimeters.

7. The system (100) of claim 1, wherein the vapour hole (140) comprises a diameter of 3 millimeters.

8. The system (100) of claim 1, wherein the vapour hole (140) comprises a diameter of 4 millimeters or more.

* * * * *